(12) United States Patent
Cremers et al.

(10) Patent No.: US 8,240,605 B2
(45) Date of Patent: Aug. 14, 2012

(54) AIRCRAFT WITH SEAT ARRANGEMENT HAVING DIFFERENT SEAT CONFIGURATIONS FOR TRANSPORT OF A PATIENT

(75) Inventors: Joerg Cremers, Hamburg (DE); Frank Starke, Stade (DE); Joerg Heuser, Schwaebisch Hall (DE)

(73) Assignee: Airbus Operations GmbH (DE)

( * ) Notice: Subject to any disclaimer, the term of this patent is extended or adjusted under 35 U.S.C. 154(b) by 1027 days.

(21) Appl. No.: 12/011,021

(22) Filed: Jan. 23, 2008

(65) Prior Publication Data

US 2008/0217477 A1    Sep. 11, 2008

Related U.S. Application Data

(60) Provisional application No. 60/898,560, filed on Jan. 31, 2007.

(30) Foreign Application Priority Data

Jan. 31, 2007    (DE) .................. 10 2007 004 830

(51) Int. Cl.
*B64D 11/00*    (2006.01)
(52) U.S. Cl. .................................. 244/118.6; 244/118.5
(58) Field of Classification Search .... 244/118.5–118.6; 105/316, 322, 315
See application file for complete search history.

(56) References Cited

U.S. PATENT DOCUMENTS

| | | | |
|---|---|---|---|
| 692,332 A * | 2/1902 | Mathews et al. ............ 105/316 |
| 2,081,529 A * | 5/1937 | Canney ..................... 244/118.6 |
| 2,280,065 A * | 4/1942 | De Roode Trimble .... 244/118.6 |
| 2,332,841 A * | 10/1943 | Buckwalter et al. ....... 244/118.6 |
| 3,898,704 A | 8/1975 | Gallaher et al. |
| 4,115,884 A | 9/1978 | Keogh |
| 4,458,864 A | 7/1984 | Colombo et al. |
| 4,527,829 A | 7/1985 | Fanslau et al. |
| 4,723,732 A * | 2/1988 | Gorges ....................... 244/118.6 |
| 4,776,532 A | 10/1988 | Haltbrekken et al. |
| 4,783,025 A | 11/1988 | Moffett |
| 4,795,112 A | 1/1989 | Hashimoto et al. |
| 5,076,515 A | 12/1991 | Goon et al. |
| 5,149,030 A | 9/1992 | Cockrill |
| 5,259,575 A | 11/1993 | Cabrera et al. |
| 5,358,306 A | 10/1994 | Christensen et al. |
| 5,383,629 A | 1/1995 | Morgan |
| 5,490,703 A | 2/1996 | Hewko et al. |

(Continued)

FOREIGN PATENT DOCUMENTS

CA    1121325    4/1982

(Continued)

*Primary Examiner* — Christopher P Ellis
(74) *Attorney, Agent, or Firm* — Lerner, David, Littenberg, Krumholz & Mentlik, LLP (57) ABSTRACT

An aircraft having a seating arrangement comprising with a plurality of seats arranged in-line in the fore and aft direction of the aircraft. In a first configuration, the seats are arranged so that the in-line spacing between seats is smaller than the height of a backrest of a seat. At least one of the seats can be reconfigured into a second configuration in which with the aid of the seat a bedded patient care area is made available. The bedded patient care area can be made use of, for example, to bed a person flat having suddenly become ill during the flight. The cabin seating can be configured in making optimum use of available space, requiring just one or two seats to be reconfigured when needed to create a bedded patient care area.

10 Claims, 4 Drawing Sheets

U.S. PATENT DOCUMENTS

| | | |
|---|---|---|
| 5,535,964 A | 7/1996 | Ahlsten |
| 5,738,306 A | 4/1998 | Moss et al. |
| 5,740,989 A * | 4/1998 | Daines ............... 244/118.6 |
| 5,779,296 A | 7/1998 | Hewko et al. |
| 5,785,277 A | 7/1998 | Manning et al. |
| 5,813,629 A | 9/1998 | Cabrera et al. |
| 6,152,401 A | 11/2000 | Green |
| 6,273,366 B1 | 8/2001 | Sprenger et al. |
| 6,578,795 B2 | 6/2003 | Romca et al. |
| 6,691,952 B2 | 2/2004 | Keogh |
| 6,715,716 B1 * | 4/2004 | Cheung ............... 244/118.6 |
| 6,845,533 B1 | 1/2005 | Tulette |
| 2003/0057323 A1 | 3/2003 | Keogh |
| 2005/0040288 A1 | 2/2005 | Keogh |
| 2005/0103935 A1 | 5/2005 | Sprenger et al. |
| 2005/0138731 A1 | 6/2005 | Failor et al. |
| 2005/0161992 A1 | 7/2005 | Engels et al. |
| 2005/0240423 A1 | 10/2005 | Becker et al. |
| 2006/0060704 A1 | 3/2006 | Lavie et al. |

FOREIGN PATENT DOCUMENTS

| | | |
|---|---|---|
| CA | 2098444 | 12/1994 |
| CA | 2317781 | 1/2000 |
| CA | 2441395 | 9/2002 |
| CA | 2479003 | 9/2003 |
| CA | 2469827 | 11/2004 |
| CN | 1274268 | 11/2000 |
| DE | 2318964 | 10/1974 |
| DE | 2903695 | 8/1979 |
| DE | 19827275 | 12/1999 |
| DE | 19983058 T0 | 4/2001 |
| DE | 102004028519 | 1/2006 |
| EP | 782524 | 7/1997 |
| EP | 885604 | 12/1998 |
| EP | 965319 | 12/1999 |
| EP | 1014850 | 7/2000 |
| EP | 1370207 | 12/2003 |
| EP | 1389455 | 2/2004 |
| EP | 1480873 | 12/2004 |
| FR | 2798842 | 3/2001 |
| FR | 2800589 | 5/2001 |
| FR | 2822372 | 9/2002 |
| FR | 2874897 | 3/2006 |
| GB | 2098935 | 12/1982 |
| GB | 2185941 | 8/1987 |
| GB | 2199798 | 7/1988 |
| GB | 2405790 | 3/2005 |
| JP | 2255144 | 10/1990 |
| JP | 10014710 | 1/1998 |
| JP | 10234798 | 9/1998 |
| JP | 2002028183 | 1/2002 |
| JP | 2002325802 | 11/2002 |
| KR | 2002046243 | 6/2002 |
| KR | 2002094249 | 12/2002 |
| RU | 2247682 | 3/2005 |
| WO | 97/13684 | 4/1997 |
| WO | 9950089 A1 | 10/1999 |
| WO | 00/03633 | 1/2000 |
| WO | 02/074218 | 9/2002 |
| WO | 03/026495 | 4/2003 |

\* cited by examiner

AIRCRAFT WITH SEAT ARRANGEMENT HAVING DIFFERENT SEAT CONFIGURATIONS FOR TRANSPORT OF A PATIENT

CROSS-REFERENCE TO RELATED APPLICATIONS

This application claims the benefit of the filing date of U.S. Provisional Patent Application No. 60/898,560 filed Jan. 31, 2007, the disclosure of which is hereby incorporated herein by reference.

FIELD OF THE INVENTION

The present invention relates to an aircraft having a seating arrangement in which a plurality of seats is arranged in-line in the fore and aft direction of the aircraft, whereby the seating arrangement can be reconfigured such that it is suitable for substantially recumbent patient transportation.

During a flight, particularly on a long-haul, there is no excluding that a passenger or member of the crew requires emergency medical treatment. For this purpose it must be mainly ensured that the person concerned may be brought into a recumbent/bedded position.

But especially in modern passenger aircraft there is a need to utilize aircraft cabin space optimally so that as many passengers as possible can be transported seated. Therefore, in such passenger aircraft, there are usually no vacant areas available which could be utilized for transporting bedded patients.

When a patient is to be transported bedded in a conventional aircraft, the backrests of the seats are usually folded to the fore. Over these folded backrest a stretcher is then installed. This involves a lot of trouble both in installation and logistics and is at the cost of 2-3 rows of seats for passenger transportation.

If such a stretcher is not installed already before take-off of the aircraft, there is usually no possibility in conventional aircraft to transport a patient having suddenly become ill during the flight bedded.

BACKGROUND OF THE INVENTION

There may be a need, to solve among other things the problems as cited above relevant to conventional aircraft by proposing, in particular, an aircraft in which patients on board the aircraft can receive emergency medical assistance during flight and in which predevised ambulance services can be implemented, wherein a bedded patient care area in which the patient can be transported recumbently is preferably configurable so that no additional space needs to be reserved in the cabin of the aircraft.

This need may be achieved by the subject matter of the independent claim. Advantageous further embodiments of the invention read from the dependent claims.

In accordance with one aspect of the present invention an aircraft having a seating arrangement is provided in which a plurality of seats is arranged in-line in the fore and aft direction of the aircraft, each having a seat pan and a backrest. In a first configuration the seats are arranged so that the in-line spacing s between neighboring seats is smaller than the height h of a backrest. In accordance with the invention at least one of the seats of the seating arrangement can be reconfigured into a second configuration in which with the aid of the seat a bedded patient care area may be made available.

Features, properties, advantages and alternative embodiments of the invention will now be detailed.

The plurality of seats is to include two, preferably three seats arranged in-line in the fore and aft direction of the aircraft. As regards the size of the seat pan and of the backrest the seats may feature a similar geometry as the seats used in the economy class of conventional aircraft. The seats preferably have a substantially horizontal seat pan and a backrest near vertical or slightly reclined to the rear from the vertical.

At least in a first configuration the seats are arranged such that a spacing between neighboring seats located in-line in the fore and aft direction is smaller than the height of the backrest of the corresponding seats. In other words, the seats are arranged relatively closely located in-line as is usual in the economy class of passenger aircraft.

In accordance with the invention at least one of the seats can be reconfigured into a second configuration in which the seat is a component of a bedded patient care area. Reconfiguring the at least one seat into a second configuration is achievable by various technical means as detailed below.

Arranging for at least one of the seats of an in-line seating arrangement in accordance with the invention to be reconfigurable from a first configuration into a second configuration to make a bedded patient care area available now does away with the need to reserve space for such a bedded patient care area in the aircraft cabin in advance when the possibility of bedded transportation of patients is to be provided. The seat spacing in the cabin of the aircraft can continue to be fully configured as is usual in the economy class. Should it become necessary in flight to bed a patient flat, the at least one seat can be reconfigured into its second configuration to then serve as a bedded patient care area. If due to reconfiguration of the at least one seat, neighboring seats are not to be occupied as may be the case in the aspects as detailed below, the passengers originally seated there can be relocated to emergency seats as are always provided in an aircraft for the crew or in the cockpit.

In accordance with one embodiment the backrest of the at least one seat can be folded down substantially horizontal for the second configuration. Herein, "substantially flat" may be understood as a position in which the backrest is arranged parallel to the floor of the aircraft cabin, but also as a position in which the backrest is reclined at an angle of up to 20 degrees from the floor of the cabin.

In conventional aircraft, closely neighboring economy class in-line seats can only be tilted slightly out of the vertical with their backrest, permitting, at the most, just a reclined but not a flat bedding position for a patient. Tilting and lowering the backrest further was hitherto not considered necessary nor sensible since this would make the seat behind unusable. The necessity and the benefits associated therewith of being able to reconfigure an economy class seat into a second configuration in which the backrest of a seat can now be further lowered was first recognized by the inventors of the present invention.

With the backrest down the seat reconfigured into the second configuration forms a bedded patient care area in which at least the head, trunk and hips of a patient can be bedded flat as has been proven to be sufficient in many emergency medical situations.

In accordance with another embodiment the backrest of the at least one seat can be folded down to the seat pan of a seat behind. Thus, the backrest of the at least one seat can be supported by the seat pan of the seat behind in the second configuration. Accordingly there may be no need for additional technical stabilizing means such as e.g. supporting legs.

In accordance with yet another embodiment, the at least one seat can be shifted in the fore and aft direction of the aircraft. For example, the at least one seat may be mounted on a track on the cabin floor or on a pallet connected to the cabin floor with guides for shifting the seat in the fore and aft direction thereon on the track. In the first configuration the seat can then be arranged so that all seats of the arrangement can be used conventionally by seated passengers, the spacing between all seats being the same. For the second configuration the seat can be shifted in the fore and aft direction either to the fore to a seat arranged in front or back to a seat as arranged to the rear thereof. It is in this way that further possibilities materialize for configuring the bedded patient care area, particularly in extending its length.

When, for instance, the at least one seat is the last seat in-line and the space behind this seat is normally to be left clear, for example, before a toilet door or before a door in the fuselage, this seat can be reconfigured into a second configuration in an emergency when a person is suddenly taken ill and needs to be transported bedded. For this purpose, for example, the backrest can be folded down horizontally and, where necessary, the seat can be additionally shifted back so that a sufficiently large leg-rest can be folded up in place to the fore of the seat. It is in this way that in an emergency a bedded patient care area can be configured so that the patient can be transported bedded flat.

In accordance with yet another embodiment at least two of the seats of the seat arrangement can be reconfigured into second configurations so that with the aid of at least two seats a bedded patient care area can be made available. In other words, two seats located in-line are reconfigurable so that they can form a component of a bedded patient care area. Since the spacing available for two seats located in-line is greater than that available for a single seat, a bedded patient care area can be created by combining two or more seats to offer enough surface for bedding an adult fully flat.

In accordance with still a further embodiment based on including at least two seats, the space between the two seats can be bridged by the backrest of the fore seat of the two. The seat pan of the aft seat may then support the backrest. As an alternative the aft seat can also be shifted back so that the backrest of the fore seat preferably fills out the spacing between the two seat pans of the two seats in thus achieving a fully flat bedded patient care area by simple ways and means.

In accordance with yet another embodiment based on including two seats, the backrest of the fore seat of the two is removable. The removable backrest of the fore seat can be fitted to its seat pan so that it can be removed easily and fast where possible without the aid of a tool. This permits instant reconfiguration of the seat also during the flight.

In accordance with still another embodiment the at least one seat comprises a folding leg-rest which can be deployed to bridge a gap between two seats. In this way a substantially flat bedded patient care area may be achieved without one of the seats needing to be shifted fore or aft.

In accordance with a further embodiment an additional, special adapter is provided for the seat arrangement in the second configuration to bridge the spacing between the two seats. The adapter may comprise a suitable geometry and size so that it simply fills out the spacing between the seats and, for example, is supported by its own legs. As an alternative the adapter can rest on and be supported by the seat pans of the two seats. In the first configuration, for example, the adapter can be stowed under the seats or under the cabin ceiling or at some other separate location in the aircraft.

In accordance with yet a further embodiment the seat arrangement of the aircraft may further comprise a bedding assembly for placement on the at least one seat or in an alternative aspect on at least two seats such that it provides a substantially flat bedding surface. In other words, not the seat pan(s), nor the backrest(s) nor the leg-rest(s) of the seat(s) themselves form the bedding surface in the bedded patient care area, but instead an additional bedding assembly placed thereon.

The bedding assembly may be flat and cushioned as is an optimum for bedding patients. In addition the bedding assembly can bridge a spacing between two or more seats located in-line for added comfort of the patient.

Furthermore, the bedding assembly may be dimensioned wider than the width of the seat pan of a seat, by, for example, the bedding surface being located above the arm-rests of the seat in making use of the space available for the arm-rests.

In accordance with yet a further embodiment the at least one seat features fixation means for safely locating a patient in the bedded patient care area. These fixation means may be provided in the form of straps adjustable in length. Preferably on the at least one seat several straps are provided spaced apart in the fore and aft direction to safely locate the patient in the bedded patient care area also during take-off and landing of the aircraft.

It is to be noted that the features as described by the individual embodiments of the present invention may be provided for singly or in any combination thereof.

The embodiments, features and benefits of the present invention as described above and further included will now be detailed in the description of specific embodiments with reference to the attached drawings:

BRIEF DESCRIPTION OF THE DRAWINGS

It is to be noted that in the figures like features are identified by like reference numerals, in the various embodiments being distinguished solely by the first numeral.

DETAILED DESCRIPTION

Figure 1A:
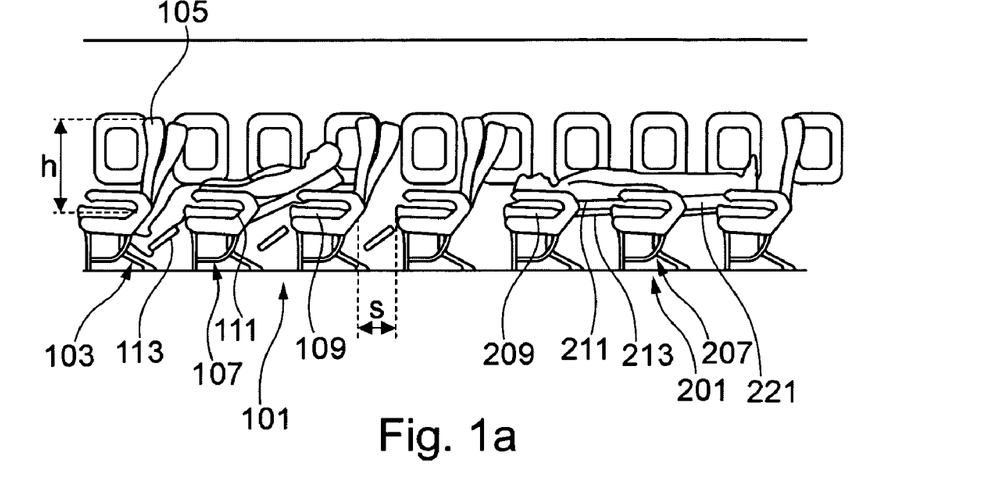
FIGS. 1a and 1b are a side view and top-down view respectively of seat arrangements for an aircraft in accordance with the present invention.
Figure 1B:
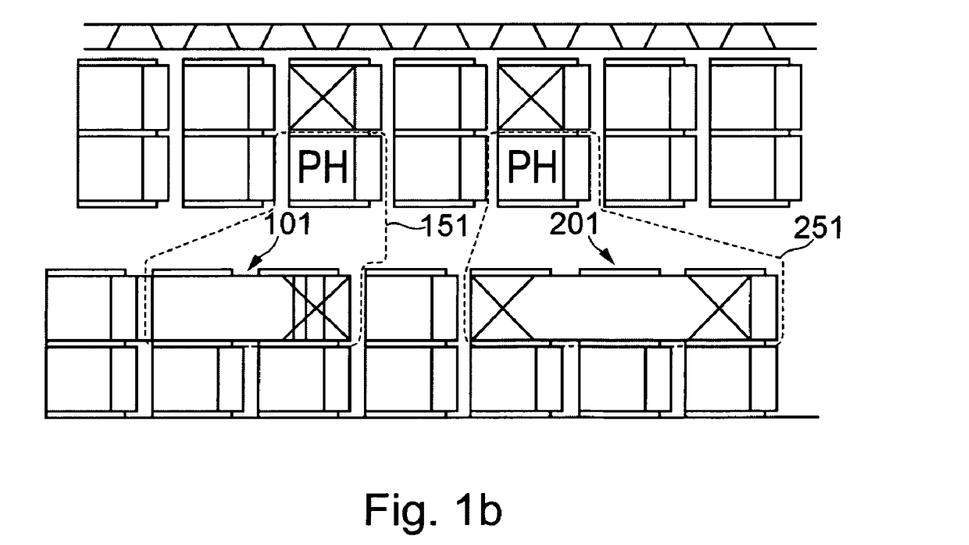

Referring now to FIGS. 1a and 1b there is illustrated a first seat arrangement 101 and a second seat arrangement 201 in an aircraft cabin.

The first seat arrangement 101 comprises a plurality of seats 103 located in-line in the fore and aft direction. The seats are arranged closely in the fore and aft direction so that the in-line spacing s between two seats is smaller than the height hh of a backrest 105 of a seat 103. The seats are secured to the floor of the aircraft cabin. The backrest 105 of most of the seats 103 can be reclined just a little from the vertical A specially configured seat 107 of the seat arrangement 101 has the feature that its backrest can be folded down much more than is usual for seats in the economy class. The backrest of this seat 107 can be folded down to rest on the seat pan 109 of the seat behind, in thus creating a bedding surface for a patient formed by the seat pan and the folded down backrest of the specially configured seat 107, termed bedded patient care area 111 in the following for bedding the patient practically horizontally.

In the second seat arrangement 201 as shown in FIG. 1 two seats 207 are configured such that their backrests can be simply removed, preferably without the aid of a tool, during the flight.

After removal of the backrests an additional bedding assembly 221 can be placed on the seat pans 209 of these two seats and a seat aft thereof. The bedding assembly 221 may be, for example, a self-supporting assembly containing a flat, cushioned bedded patient care area within a frame and which is supported by the seat pans 209 of the seats 207. The cushioned bed may also be an inflatable mattress which is not self-supporting but can be compactly stowed. The support in this case would be provided by leg supports folded upwardly and the seat pans as described below. It is in this way that a bedded patient care area 211 can be created offering sufficient room to transport an adult bedded horizontally.

Since such a large bedding assembly may be a problem to stow within the aircraft, as an alternative it may be provided for that specially matching adapters which are smaller and easier to stow (not shown in FIGS.) are located between the seat pans 209 of two seats located in-line with their backrests removed. It is in this way too, that a large, practically flat bedded patient care area 211 can be created, whereby the adapters may be supported by the seat pans 209 or on legs of their own for support by the cabin floor.

As an alternative the seats may comprise a leg-rest 113, 213 which can be deployed flat and having a geometry and stability to ensure filling out or bridging the spacing between two seats located in-line.

Figure 2A:
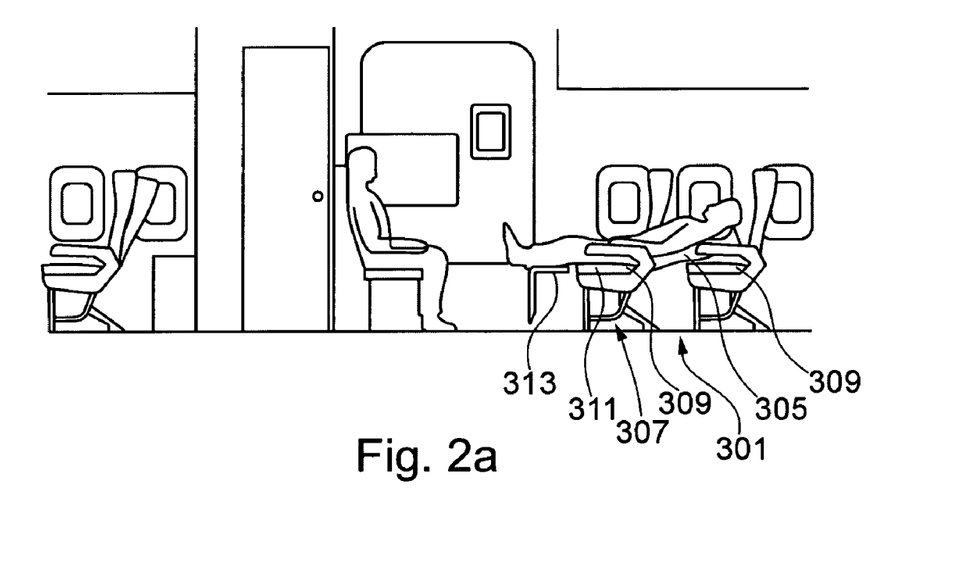
FIGS. 2a and 2b are a side view and top-down view respectively of a seat arrangement for an aircraft in accordance with a further embodiment of the present invention.
Figure 2B:
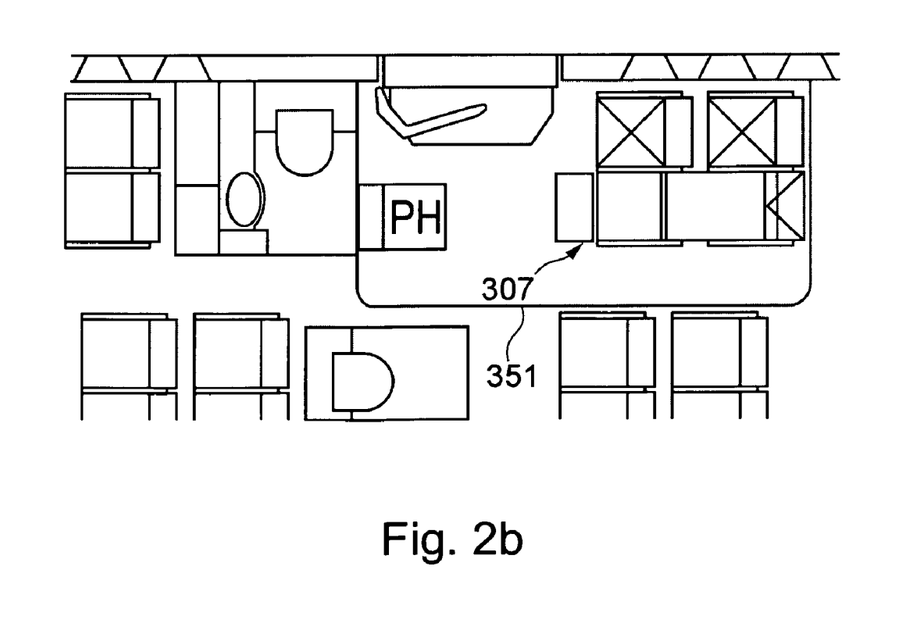

Referring now to FIGS. 2a and 2b there is illustrated a further alternative seat arrangement 301. In this seat arrangement 301 the foremost seat borders a door area which in general needs to be maintained freely accessible for safety reasons. The foremost seat 307 of this seat arrangement 301 is configured such that its backrest 305 can be folded down onto the seat pan of the seat behind and its leg-rest 313 can be deployed flat so that the leg-rest 313, seat pan 309 and backrest 305 form together a near horizontal bedded patient care area 311. Since a free area is located before the seat 307 the bedded patient care area 311 can protrude into this area in an emergency so that sufficient room is made available for bedded transportation of a person having suddenly taken ill.

Figure 3A:
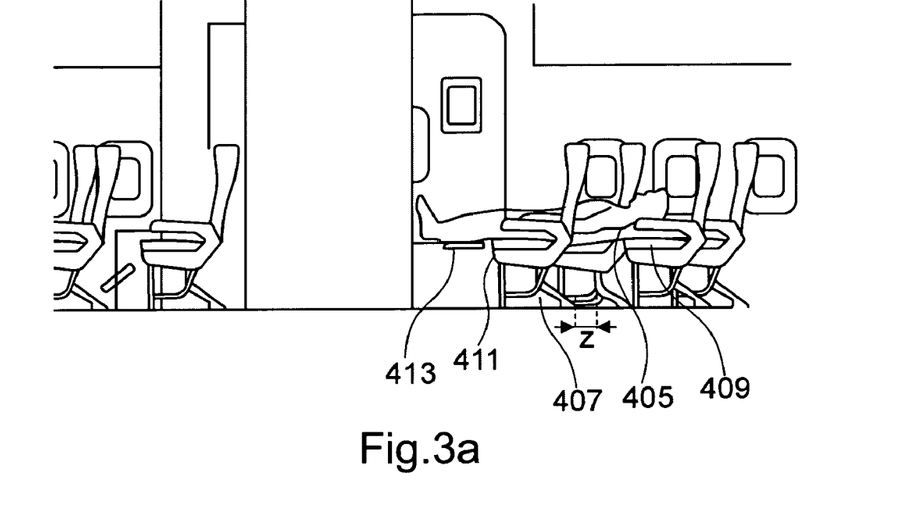
FIGS. 3a and 3b are a side view and top-down view respectively of a seat arrangement for an aircraft in accordance with yet another embodiment of the present invention.
Figure 3B:
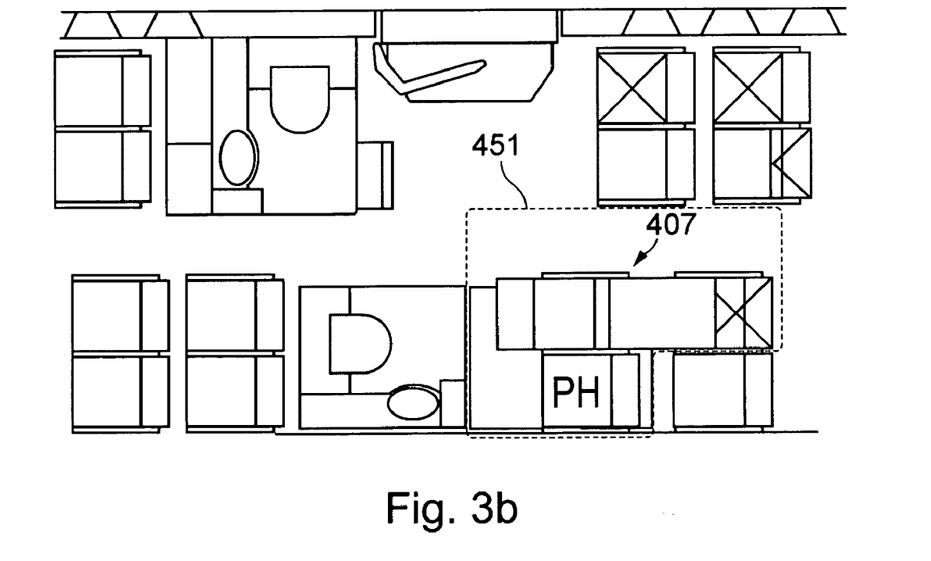

Referring now to FIGS. 3a and 3b there is illustrated how to enhance the bedding comfort for a patient the seat 407 forming the bedded patient care area 411 is arranged movable on a track 431 or the seat can be shiftably mounted on a pallet connected to the floor of the cabin. It is in this way that the seat 407 can be moved to the fore in the fore and aft direction of the aircraft so that the backrest 405 of the seat 407 can be folded down flatter to improve the bedding comfort of the patient. The shifting range can be selected from a few cm to a distance which is sufficient to fold down the backrest 405 of the seat 407 completely horizontal without it resting on the seat located behind.

Figure 4A:
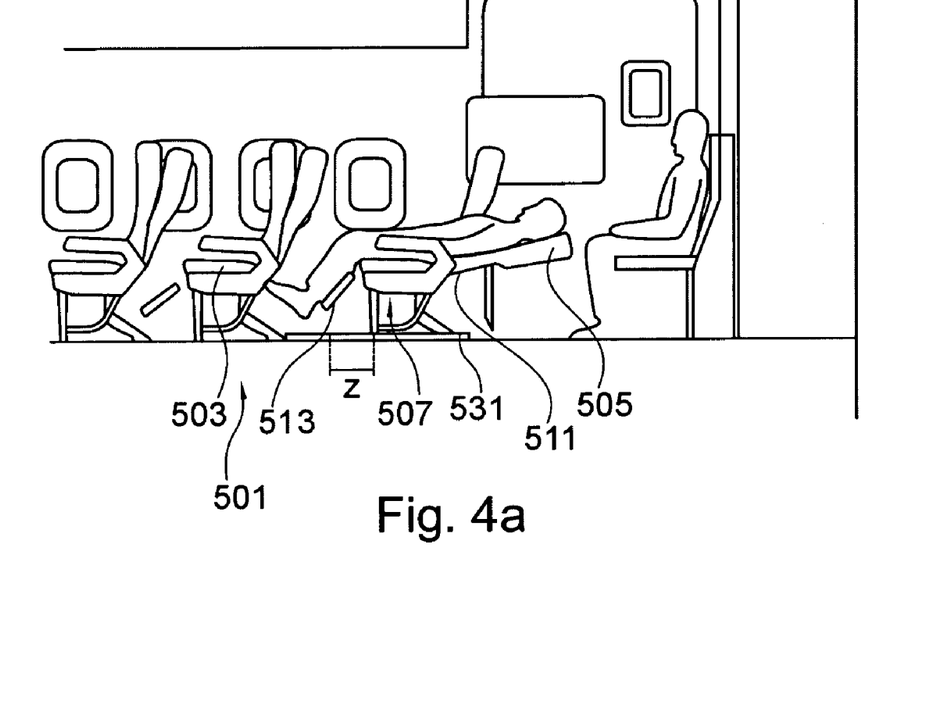
FIGS. 4a and 4b are a side view and top-down view respectively of a seat arrangement for an aircraft in accordance with still another embodiment of the present invention.
Figure 4B:
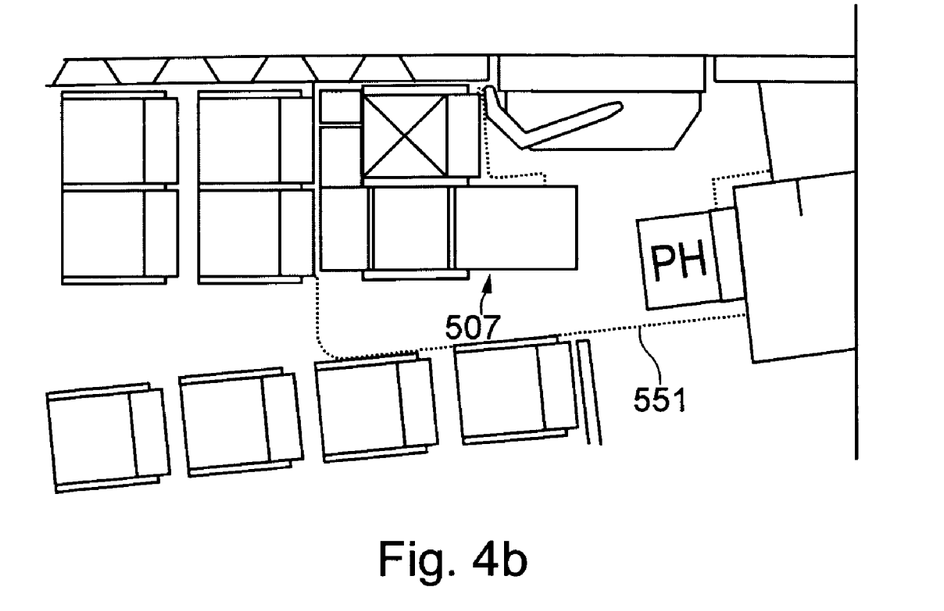

Referring now to FIGS. 4a and 4b there is illustrated an alternative embodiment for making available a bedded patient care area. In this embodiment, the sternmost seat 507 of a seat arrangement 501 is designed so that its backrest 505 can be folded down horizontally. Since aft of the seat 507 a door area is located which generally needs to be maintained freely accessible the backrest 505 can be folded down far in an emergency without touching other seats or objects. To further add space to the bedded patient care area 511 formed in this way the seat 507 can be moved to the rear on a track 531 or the seat may be movably mounted on a pallet connected to the cabin floor. In addition a leg-rest 513 can be folded up horizontally. Furthermore, the bedded patient care area can be made longer by shifting the seat 503 to the fore.

Shown in the figures is a medical treatment area for a medic, for example, a physician, identified "PH". The medical treatment area is located as near as possible to the bedded patient care area so that the medic or doctor can look after the patient all the time. The medical treatment area can be configured by folding down the backrest to the rear and by shifting a seating device. As an alternative the medical treatment area can be configured by folding down the backrest of a seating device adjoining the bedded patient care area. As a further alternative the medical treatment area can be integrated in a seating device and made available when required by deploying the seating device.

To screen off the medical treatment area from the remainder of the aircraft cabin, curtaining 151, 251, 351, 451, 551 can be provided to enclose the area.

It is to be noted in conclusion that such terms as "include", "comprise", "contain", and the like, must not be interpreted to exclude the presence of further elements. Also where "a" or "one" is used this does not exclude the existence of a plurality of objects. The reference numerals in the claims merely serve a better understanding and must not be interpreted as a restriction as claimed in any way.

The invention claimed is:

1. An aircraft having a seating arrangement, the seating arrangement comprising:
   a plurality of seats arranged in-line in the fore and aft direction of the aircraft, each seat having a seat pan and a backrest;
   wherein, in a first configuration, the seats are arranged so that the in-line spacing between seats neighboring one another in the fore and aft direction is smaller than the height of the backrest; and
   wherein, in a second configuration, at least one seat of the plurality of seats is configured to provide a bedded patient care area; and
   wherein the backrest of the at least one seat is foldable down such as to engage the seat pan of a seat located aft thereof.

2. The aircraft as set forth in claim 1, wherein the backrest of the at least one seat is configured to be folded down substantially horizontally.

3. The aircraft as set forth in claim 1, wherein the at least one seat is shiftably mounted in the fore and aft direction of the aircraft.

4. The aircraft as set forth in claim 1, wherein at least two seats of plurality of seats of the seating arrangement are configured to provide a bedded patient care area.

5. The aircraft as set forth in claim 4, wherein the backrest of the fore seat of the at least two seats is configured to bridge a spacing between the at least two seats.

6. The aircraft as set forth in claim 1, wherein the backrest of the at least one seat is configured to be readily removable during flight of the aircraft.

7. The aircraft as set forth in claim 1, wherein the at least one seat comprises a leg-rest configured to bridge a space located to the fore of the seat.

8. The aircraft as set forth in claim 1, wherein the seating arrangement further comprises an adapter configured to bridge a spacing between two seats located in-line with one another.

9. The aircraft as set forth in claim 1, further comprising a bedding assembly configured to be arranged on the at least one seat such that the bedding assembly provides a substantially horizontal patient bedding surface.

10. The aircraft as set forth in claim 1, wherein further comprising fixation means cat for safely locating a patient in the bedded patient care area; wherein the fixation means is provided at the at least one seat.

* * * * *

UNITED STATES PATENT AND TRADEMARK OFFICE
CERTIFICATE OF CORRECTION

| | | |
|---|---|---|
| PATENT NO. | : 8,240,605 B2 | Page 1 of 1 |
| APPLICATION NO. | : 12/011021 | |
| DATED | : August 14, 2012 | |
| INVENTOR(S) | : Joerg Cremers, Frank Starke and Joerg Heuser | |

It is certified that error appears in the above-identified patent and that said Letters Patent is hereby corrected as shown below:

In the Claims

Claim 10, Column 7, Line 3 "wherein" following the number 1, should be deleted.

Claim 10, Column 7, Line 4 "cat" following the word means should be deleted.

Signed and Sealed this
Twenty-third Day of September, 2014

Michelle K. Lee
*Deputy Director of the United States Patent and Trademark Office*